(No Model.)

M. RICHARDSON.
TOOL FOR TRIMMING STRAWBERRY VINES.

No. 326,787. Patented Sept. 22, 1885.

WITNESSES
F. L. Durand
J. Fred. Reily

INVENTOR
Meritt Richardson
By Louis Bagger & Co.
Attorneys.

N. PETERS, Photo-Lithographer, Washington, D. C.

UNITED STATES PATENT OFFICE.

MERITT RICHARDSON, OF OWOSSO, MICHIGAN.

TOOL FOR TRIMMING STRAWBERRY-VINES.

SPECIFICATION forming part of Letters Patent No. 326,787, dated September 22, 1885.

Application filed August, 18 1885. (No model.)

*To all whom it may concern:*

Be it known that I, MERITT RICHARDSON, a citizen of the United States, and a resident of Owosso, in the county of Shiawassee and State of Michigan, have invented certain new and useful Improvements in Garden-Tools; and I do hereby declare that the following is a full, clear, and exact description of the invention, which will enable others skilled in the art to which it appertains to make and use the same, reference being had to the accompanying drawings, which form a part of this specification.

My invention relates to garden-tools; and it has for its object the production of a tool of this class which is especially adapted to be used for cutting and trimming the straggling vines or runners from strawberry-hills, thereby keeping the plants within proper bounds, so as to prevent them from running into matted rows and over the whole ground, and thus insuring large berries of a superior quality.

To these ends my invention consists in the improved construction, arrangement, and combination of parts, which will be hereinafter fully described, and pointed out in the claims.

Figure 1:
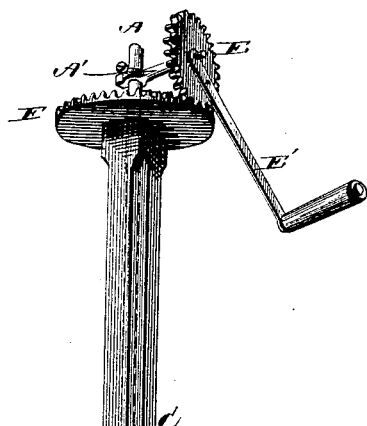
Figure 2:
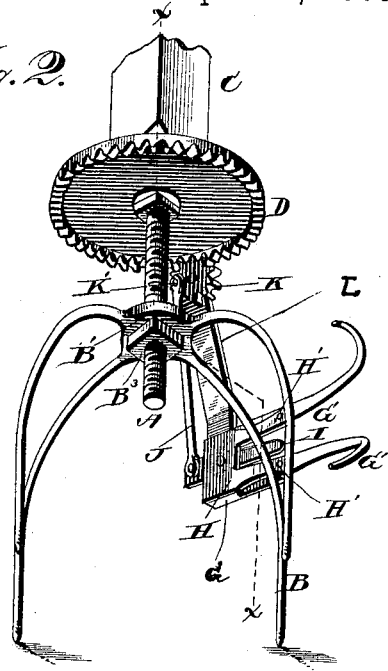
Figure 3:
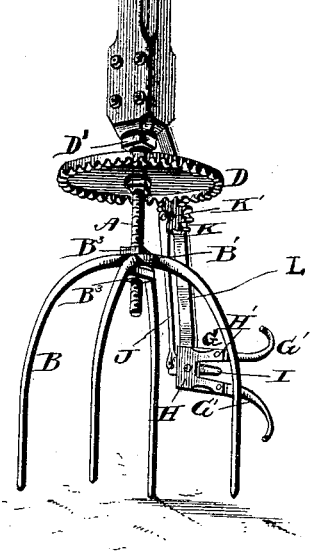
Figure 3:
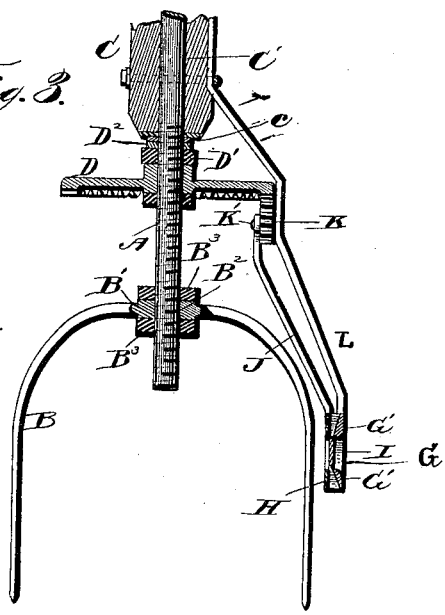

Referring to the annexed drawings, Figure 1 is a perspective view of my improved garden-tool. Fig. 2 is a perspective detail view of the lower portion of the same; and Fig. 3 is a sectional view taken on line $x\ x$, Fig. 2, of the drawings.

The same letters of reference indicate corresponding parts in all the figures.

Referring to the several parts by letters, A represents the stationary supporting-rod, which is made of a sufficient length to enable the operator to stand erect when using the tool, and the lower end of which is screw-threaded, as shown, to adapt the legs B to be secured adjustably thereon, the said legs being formed in a single piece, with a central body portion, B′, which is provided with a central aperture, B², through which the lower screw-threaded end of the rod A passes, the legs being secured adjustably in their operative position by placing the nuts B³ B³ above and below the body portion B′, as shown, so that by screwing the said nuts up or down on the screw-threaded end of the rod A the legs B can be readily adjusted vertically, as will be readily understood, for the purpose hereinafter set forth.

C indicates a sleeve, preferably of wood, which is provided with a central longitudinal aperture, C′, to adapt it to be placed in operative position upon the rod A and turn freely thereon. The lower screw-threaded end of the rod A is provided at a point above the legs B with the adjustable gear-wheel D, a washer, D², being placed above the upper binding-nut, D′, which secures the wheel D in position, against which the lower end of the sleeve C (which is also provided with a washer, $c$) bears when the tool is in its operative position, while to the upper end of the rod A, above the upper end of the sleeve C, is adjustably secured an arm, A′, upon the outer end of which is journaled a gear-wheel, E, having an operating-handle, E′, by means of which it is rotated, the said wheel E meshing with a gear-wheel, F, secured rigidly (and concentrically) upon the upper end of the sleeve C.

To one side of the lower end of the sleeve C is removably secured by its upper end the curved downwardly-projecting arm or bracket L, which carries the cutting device. This cutting device consists of the fork G, which is secured to the lower end of the arm G at right angles thereto, and is formed with the prongs G′ G′, the free ends of which diverge and are curved in the manner shown in the drawings.

To the inner face or side of the fork is secured the metal guard plate, H, having the projections H′ H′, which extend along the inner side of the prongs G′ G′ for a distance somewhat beyond the point reached by the end of the knife-blade, for the purpose hereinafter specified.

The knife I is pivotally secured at the inner side of the fork, between the same and the guard-plate H, a sufficient space or recess being formed in the inner side of the fork to admit of the free movement of the knife on its pivotal point. The forward portion of the blade of the knife, both edges of which are beveled and sharpened, as shown, projects forward between the prongs G′ G′ of the fork, as shown. The rear end of the knife, which projects slightly beyond the rear end of the fork, is connected pivotally to the lower bifurcated end of a pitman, J, the upper end of which is pivoted upon a wrist-pin, K′, of a pinion, K, journaled upon the inner side of the arm or bracket L at such a point that it will mesh with the gear-wheel D, secured upon the lower portion of the rod A below, the lower end of the sleeve C.

The manner in which the cutting mechanism is operated is as follows: The lower ends of the legs B, which are preferably sharpened, are inserted in the ground encircling the particular plant around which it is desired to trim, the said legs being adjusted on the lower screw-threaded end of the rod A to regulate the height at which the cutting apparatus works. By then turning the operating-handle attached to the upper gear-wheel, E, the sleeve C will be rotated, and the teeth of the small pinion K intermeshing with the teeth of the large gear-wheel D, secured rigidly on the lower portion of the rod A, (around which it rotates,) the said pinion will be rapidly rotated, and thereby, through the connecting-pitman J, oscillate or vibrate the knife I rapidly from side to side, thereby effectually cutting the runners from the hill, as will be readily understood.

The outer sides of the projections of the guard-plate, which extend over the inner sides of the fork-prongs, are cut away, as shown, and the inner faces of the said prongs, over which the knife passes, are beveled outward, as clearly shown in Fig. 3 of the drawings, the object of this arrangement being to prevent the knife from clogging, as the blade will thus force all dirt or other obstructions through the space between the guard-plate and the prongs, the said obstructions passing readily through the beveled or enlarged space before described.

It will be seen that by diverging the prongs, or curving them outward, as shown, that as the blade passes between each prong and its guard-plate it will cut the runners with a shear or "draw" cut, which is the most effective cut possible to employ.

It will be seen that by causing the sleeve which carries the cutting device to rotate as described the runners will be cut from every side of the hill, the diverging prongs of the fork gathering the runners into the knife, as will be readily understood.

From the foregoing description, taken in connection with the accompanying drawings, the construction and operation of my improved tool will be readily understood without requiring further explanation.

It will be seen that my invention is simple in construction, and therefore cheap to manufacture, and is also not liable to break or get out of order, while at the same time it is very efficient in its operation.

Having thus described my invention, what I claim, and desire to secure by Letters Patent of the United States, is—

1. The combination of the stationary supporting-rod provided at its lower end with the adjustable legs, a revoluble sleeve mounted longitudinally upon the said rod, having at its lower end a curved bracket provided with a suitable cutting device arranged at right angles thereto, and means for rotating the said sleeve on the stationary rod and reciprocating the cutter-blade.

2. The combination, with the stationary supporting-rod provided at its lower screw-threaded end with the adjustable legs formed in a single piece with a central body portion, and the gear-wheel arranged above the said legs, as shown, of the revoluble sleeve mounted longitudinally upon the said rod and provided at its lower end with the curved arm or bracket, the fork mounted upon the lower end of the said arm or bracket at right angles thereto and formed with the diverging and curved prongs, the guard-plate secured upon the inner side of the said fork, the pivoted knife-blade arranged as described and adapted to operate with a "shear" or draw cut, the pinion secured upon the inner side of the said arm or bracket and provided with a wrist-pin, the pitman connecting the rear end of the pivoted knife to the said wrist-pin, and means for rotating the revoluble sleeve, all constructed and arranged to operate in the manner and for the purpose herein shown and set forth.

3. The combination, with the stationary supporting-rod provided at its lower screw-threaded end with the adjustable legs formed in a single piece with a central body portion, and the gear-wheel arranged above the said legs, as shown, and having at its upper end the arm carrying the revoluble gear-wheel provided with an operating-handle, of the revoluble sleeve mounted longitudinally upon the said rod, having secured rigidly to its upper end the gear-wheel arranged concentrically with the sleeve, and provided at its lower end with the curved arm or bracket, the fork mounted upon the lower end of the said arm or bracket at right angles thereto and formed with the diverging and curved prongs, the guard-plate secured upon the inner side of the said fork, the pivoted knife-blade arranged as described and adapted to operate with a shear or draw cut, the pinion secured upon the inner side of the said bracket and provided with a wrist-pin, and the pitman connecting the rear end of the pivoted knife to the said wrist-pin, all constructed and arranged to operate in the manner and for the purpose herein shown and described.

4. The combination of the fork having the diverging prongs formed on their inner sides with the outwardly-beveled recesses, the guard-plate having the projections cut away on their outer sides, as shown, and the pivoted knife arranged as described and shown, being beveled and sharpened on each side, and means for operating the said knife in the manner described.

In testimony that I claim the foregoing as my own I have hereunto affixed my signature in presence of two witnesses.

MERITT RICHARDSON.

Witnesses:
J. FRED. REILY,
ARTHUR L. MORSELL.